Patented Oct. 21, 1952

2,614,917

UNITED STATES PATENT OFFICE 2,614,917

PLANT GROWTH REGULANTS

John W. Zukel, Hamden, and Walter D. Harris, Naugatuck, Conn., assignors to United States Rubber Company, New York, N. Y., a corporation of New Jersey No Drawing. Application January 4, 1951, Serial No. 204,490

21 Claims. (Cl. 71—2.5)

This invention relates to plant growth regulants, particularly for inhibiting plant growth and destroying certain plants.

We have found that monoacylated maleic hydrazides in which the acyl group is derived from a carboxylic acid, which compounds are new chemicals, are effective plant growth regulants, and have various advantages over maleic hydrazide (1,2-dihydropyridazine-3,6-dione), and its salts. The new chemicals of the present invention also have other uses, for example, as intermediates for further chemical reactions.

The acylated derivatives of maleic hydrazide of the present invention may have one of the isomeric structures shown below which are acyl derivatives of the di-keto form, the mono-keto mono-enol form, and the di-enol form, respectively, of maleic hydrazide in which the RCO of the structural formulae represents an acyl radical derived from a carboxylic acid (by removal of a hydroxyl group):

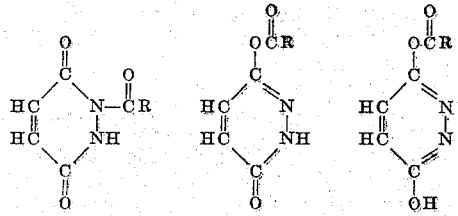

The chemicals of the present invention are readily prepared by reacting the appropriate carboxylic acid halide with an alkali salt of maleic hydrazide as in the following illustrative reaction of the potassium salt of maleic hydrazide and lauroyl chloride (see Example V below):

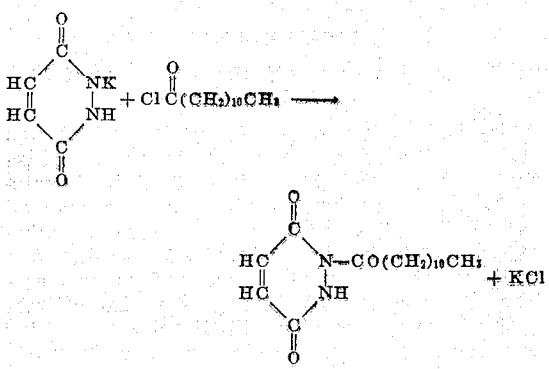

The lower carboxylic acid acyl derivatives of maleic hydrazide are also readily prepared by heating maleic hydrazide with the acid anhydride as in the following illustrative reaction of maleic hydrazide and acetic anhydride (see Example I below):

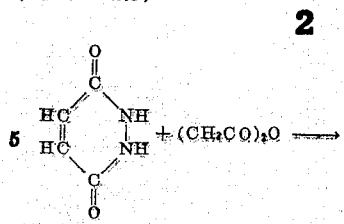

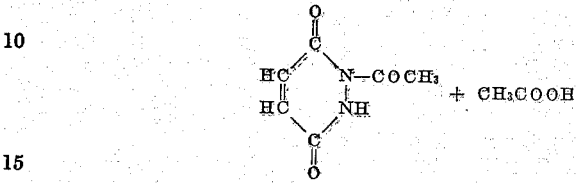

There results only monoacylation of the maleic hydrazide.

The parent acid of the acyl substituent may be an aliphatic monocarboxylic acid, saturated or unsaturated, giving compounds that may be designated generically as alkanoyl maleic hydrazides and alkenoyl maleic hydrazides, respectively. The parent acid of the acyl substituent may be a substituted aliphatic monocarboxylic acid, e. g., chloro substituted or cyclic (aromatic or chloroaromatic or heterocyclic) substituted or condensed cyclic substituted alkanoic acid. The parent acid of the acyl substituent may be an aromatic or substituted aromatic monocarboxylic acid, e. g. chloro or hydroxy or alkoxy substituted aromatic acid, giving compounds that may be designated generically as aroyl maleic hydrazides, chloroaroyl maleic hydrazides, hydroxyaroyl maleic hydrazides, and alkoxyaroyl maleic hydrazides. The parent acid of the acyl substituent may be a heterocyclic mono carboxylic acid. Examples of such acylated derivatives of maleic hydrazide wherein the parent acid of the acyl substituent is a monocarboxylic acid are:

Acetyl maleic hydrazide
Propionyl maleic hydrazide
Acrylyl maleic hydrazide
Butyryl maleic hydrazide
Crotonyl maleic hydrazide
Isobutyryl maleic hydrazide
Alpha-methylisocrotonyl maleic hydrazide
Valeryl maleic hydrazide
Isovaleryl maleic hydrazide
Caproyl maleic hydrazide
2-ethylbutyryl maleic hydrazide
Chloroacetyl maleic hydrazide
Trichloroacetyl maleic hydrazide
Alpha-naphthylacetyl maleic hydrazide
Beta-naphthoxyacetyl maleic hydrazide
Indoleacetyl maleic hydrazide
Indolebutyryl maleic hydrazide
2,4-dichlorophenoxyacetyl maleic hydrazide 2,4,5-trichlorophenoxyacetyl maleic hydrazide
Phenylacetyl maleic hydrazide
Octanoyl maleic hydrazide
2-ethylhexoyl maleic hydrazide
9-hendecenoyl maleic hydrazide
Decanoyl maleic hydrazide
Lauroyl maleic hydrazide
Tetradecanoyl maleic hydrazide
Hexadecanoyl maleic hydrazide
Oleyl maleic hydrazide
Linoleyl maleic hydrazide
Benzoyl maleic hydrazide
Toluyl maleic hydrazide
Chlorbenzoyl maleic hydrazide
Anisoyl maleic hydrazide
Salicylyl maleic hydrazide
Furoyl maleic hydrazide
2-pyridinecarbonyl maleic hydrazide The parent acid of the acyl substituent may be an aliphatic, or a substituted aliphatic, e. g. hydroxyaliphatic, or an aromatic dicarboxylic acid. One or each of the carboxyl radicals of such dicarboxylic acids may have its hydroxy group substituted by the residue of maleic hydrazide on removal of a hydrogen atom therefrom. Thus one or two mols of maleic hydrazide may be monoacylated by a mol of a dicarboxylic acid, for example, oxalic acid, malonic acid, succinic acid, maleic acid, fumaric acid, phthalic acid, tartaric acid, glutaric acid, adipic acid.

Specific illustrative examples of the preparation of the compounds of the present invention are shown in Examples I to VI below:

EXAMPLE I

*Preparation of acetyl maleic hydrazide*

Maleic hydrazide (112 g.) was heated to reflux temperature with acetic anhydride (204 g.) until all the solid had dissolved. An equal volume of benzene was added to the cooled solution. Ligroin was then added until the solution was faintly cloudy. On standing white needles formed. These were collected by vacuum filtration, washed with ligroin and dried; yield, 79 g., M. P. 123° C. An additional 33.5 g., M. P. 121–123° C. was isolated from the filtrate by concentrating, redissolving in benzene and diluting with ligroin.

EXAMPLE II

*Preparation of propionyl maleic hydrazide*

A solution of maleic hydrazide (20 g.) in 100 cc. of propionic anhydride was refluxed for about 2½ hours. The resulting solution was dissolved in a hot benzene-ligroin mixture. On cooling and seeding, a white crystalline precipitate formed. It was collected on a vacuum filter, washed with ligroin and dried; yield 13 g., M. P. 124–125° C. Analysis calculated as $C_7H_8O_3N_2$, 16.68% N; found, 16.65% N.

EXAMPLE III

*Preparation of caproyl maleic hydrazide*

The potassium salt of maleic hydrazide (117 g.) was stirred into a cooled solution consisting of caproyl chloride (104 g.), and 700 cc. of benzene. Stirring was continued for about ½ hour after addition was complete. The mixture was filtered and the precipitate was washed with benzene. The combined filtrate was diluted with about 700 cc. of ligroin. The resulting solution on cooling in an ice-water bath deposited white needles; yield 57.7 g.; M. P. 88–89° C. Analysis calculated for $C_{10}H_{14}O_3N_2$, 13.32% N; found 13.2% N.

EXAMPLE IV

*Preparation of 2-ethylhexoyl maleic hydrazide*

750 g. of potassium salt of maleic hydrazide was weighed into a 5 liter 3-neck flask equipped with stirrer, condenser, and dropping funnel. About 2 liters of benzene was added to make it a workable slurry. 2-ethyl hexoyl chloride (815 g.) was added gradually through the dropping funnel with the mixture stirring. The initial reaction causes enough heat to start refluxing which was continued for 1 hour by heating with a glass mantle. Stirring was continued throughout. The mixture was poured into about 8 liters of cold water and stirred. 6 normal NaOH was added until pH of 9 was obtained, about 200 ml. being required. The water layer was siphoned off and the benzene layer washed twice with 4 liters of cold water. The pH at this point was 6.5. The benzene was topped under reduced pressure to a pot temperature of 110° C./15 mm. Yield=1058 g. (theory=1190 g. or 88.9% yield). The product was recrystallized from 2½ liters of ligroin (70–90°). A second crop of crystals was obtained by cooling in a Dry Ice chest. The total yield was 906 g. The melting point was 58 to 61° C.

EXAMPLE V

*Preparation of lauroyl maleic hydrazide*

The potassium salt of maleic hydrazide (7.5 g.) was added with stirring to a solution of lauroyl chloride (10.9 g.) in several volumes of benzene. The reaction was exothermic. The mixture was heated to dissolve the organic material. The salt was removed by washing with water. The benzene solution was concentrated under reduced pressure. The waxy solid which formed on cooling was stirred with ligroin. The fluffy white solid (6.5 g.) was collected by vacuum filtration, washed with ligroin and dried. It melted at 111–113° C.

EXAMPLE VI

*Preparation of benzoyl maleic hydrazide*

A solution of maleic hydrazide (22.4 g.) and sodium hydroxide (9.0 g.) in 100 cc. of water was cooled by addition of 100 g. ice. Benzoyl chloride was added and the mixture was stirred for about ½ hour. The mixture was filtered and the precipitate was recrystallized from ethanol, yielding white needles which melted at 156–160° C. Recrystallization from a benzene-acetone mixture yielded the benzoyl maleic hydrazide which melted at 159–163° C.

EXAMPLE VII

*Preparation of 2,4-dichlorophenoxyacetyl maleic hydrazide*

2,4-dichlorophenoxyacetyl chloride (24 g.) was added with stirring to a suspension of the potassium salt of maleic hydrazide (15 g.) in dioxane (100 cc.). The mixture heated spontaneously to 55° C. It was then heated to reflux for a few minutes after which it was filtered. On cooling, fine white crystals formed. The product was collected by vacuum filtration, washed three times with dioxane and twice with ligroin, then dried in an oven at 72° C. The fluffy snow-white product weighed 21 g. and melted at 168–170° C. Analysis calculated for $C_{12}H_8O_4Cl_2N_2$, 22.5% Cl; found, 21.61% Cl.

The acyl derivatives of maleic hydrazide of the present invention may be applied to plants (the term "plants" including plant parts, e. g. seeds, foliage, stems, etc.) directly, or in an inert medium as a dust in admixture with a powdered solid carrier, such as the various mineral silicates, e. g. mica, talc, pyrophyllite and clays, or as an aqueous spray. The chemicals may be applied in admixture with small amounts of surface-active agents, which may be anionic, non-ionic, or cationic surface-active agents which may act as wetting agents to facilitate wetting of the plant surfaces to which they are applied, and as aids in dispersing the chemicals in water. The chemicals of the invention may be admixed with powdered solid carriers, such as mineral silicates, together with a small amount of such surface-active agent so that a wettable powder may be obtained which may be applied directly to plants, or which may be shaken up with water to readily prepare a suspension of the chemical (and powdered carrier) for application to plants in that form. The chemicals of the invention may be dissolved or suspended in water-insoluble organic medium, e. g. liquids, oils, waxes or wax-like solids, and the chemicals in such organic media may be applied directly to plants, or may be emulsified or dispersed in water with the aid of such anionic, non-ionic, or cationic surface-active agents and applied as aqueous sprays in which the dispersed phase comprises particles of the organic media containing the acylated derivatives of maleic hydrazide.

The acylated derivatives of maleic hydrazide are particularly adapted to oil formulations, and to application in the form of aqueous emulsions of oil and other organic solvent solutions of the chemicals, which in many cases are the preferred type of compositions for applying plant growth regulants. With reference to oil and similar formulations, the acylated derivatives of maleic hydrazide have advantages over maleic hydrazide and its salts in the following respects: (1) Oils are extensively used as herbicides but are not translocated; thus after killing the vegetative growth, the roots send up new plants. The addition of maleic hydrazide to oil is desirable to secure translocation of maleic hydrazide to kill roots. Acyl derivatives of maleic hydrazide often produce an enhanced plant response over maleic hydrazide and its salts in this regard. (2) There is evidence that maleic hydrazide penetrates the plant slowly over a period of two days. Any rainfall occurring within this period washes off maleic hydrazide or its water soluble salts and reduces their effectiveness. This washing off may be prevented by oil formulations of acyl derivatives of maleic hydrazide which are not water-soluble. (3) The exact mode of action of maleic hydrazide has not been determined. It appears to block some mechanism in the plant. The degree of block is associated with plant response, thus producing either a temporary inhibition or herbicidal effect. The acyl derivatives of maleic hydrazide can be formulated in an organic medium, such as lanolin in which they are soluble, which serves as a substrate and continuously releases the growth regulant to give a prolonged response.

The anionic surface-active agents that may be used in the present growth regulant compositions are those having a general formula selected from the group consisting of R—COOM, R—SO$_3$M, and R—OSO$_3$M, where M represents alkali-metal, ammonium or substituted ammonium (amine) radical, and R represents an organic radical containing at least one group having more than 8 carbon atoms. Examples of such anionic surface-active agents are:

(1) Soaps (e. g. sodium laurate, ammonium stearate, diethanol-ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g. C$_{17}$H$_{33}$—O—C$_2$H$_4$—SO$_3$—Na)

(5) Sulfated ethers of long and short chain aliphatic groups (e. g. C$_{17}$H$_{33}$—O—C$_2$H$_4$—O—SO$_3$Na)

(6) Sulfonated alkyl esters of long chain fatty acids (e. g.

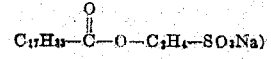

(7) Sulfonated glycol esters of long chain fatty acids (e. g.

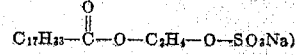

(8) Sulfonated alkyl substituted amids of long chain fatty acids (e. g.

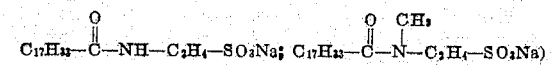

(9) Alkylated aryl sulfonates (e. g. isopropyl naphthalene sodium sulfonate, dodecyl benzene sodium sulfonate).

(10) Hydroaromatic sulfonates (e. g. tetrahydro-naphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

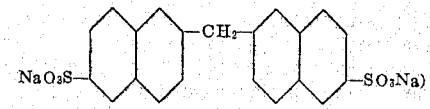

Non-ionic surface-active agents that may be used in the present growth regulant compositions are:

(1) Monoethers of polyglycols with long chain fatty alcohols, such as reaction products of ethylene oxide or polyethylene glycol with a long-chain fatty alcohol (e. g. reaction product of ethylene oxide and oleyl alcohol, viz:

where $n$ is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

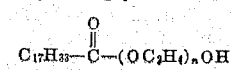

where $n$ is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

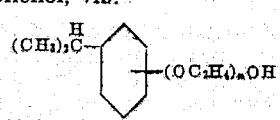

where $n$ is 10 to 20).

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used in the present growth regulant compositions are:

(1) Quaternary ammonium salts in which one of the groups attached to the nitrogen has an aliphatic group having at least 8 carbon atoms (e. g. trimethyl cetyl ammonium iodide, lauryl pyridinium chloride, cetyl dimethyl benzyl ammonium chloride, N-stearyl betaine).

(2) Amines, amids, diamines and glyoxalidines having an aliphatic group containing at least 8 carbon atoms, and their acid esters (e. g. stearylamine hydrochloride, oleyl amide, diethylethylene oleyl diamine, mu-heptadecyl N-hydroxyethyl glyoxalidine).

The effectiveness of the acylated derivatives of maleic hydrazide of the present invention as plant growth regulants is shown below. Reference herein to plant growth regulants and plant growth regulation includes altering the growth characteristics of plants as by temporarily inhibiting plant growth or by destroying certain plants (phytocides or herbicides), and also includes so-called hormone responses, such as promotion of storage stability of crops, causing abscission of fruit and producing male sterile plants (parthenocarpy).

EXAMPLE VIII

Single ten foot rows of hybrid field corn averaging six inches in height were sprayed to runoff with aqueous dispersions of acetyl maleic hydrazide. The chemicals were dispersed at 1:400 dosages in water containing 0.03% of Antarox A 200 (a commercial dispersing and wetting agent which is an alkyl aryl polyethylene glycol). A check row was sprayed with an aqueous solution of 0.03% of the Antarox A 200 without the acetyl maleic hydrazide.

Nineteen days later, the average height of the corn in the check row was ten inches and the plants showed no burning of the foliage, no chlorosis (yellowing of foliage) and no development of anthocyanin pigmentation (red or purple color of foliage). The corn treated with the acetyl maleic hydrazide had an average height of six inches, showed no burning of the foliage, but severe chlorosis and development of heavy anthocyanin pigmentation. In this and other tests herein, burning, chlorosis and development of anthocyanin pigmentation was scored 0 to 5, 0 meaning none, 1 meaning slight, 2 meaning heavy, 3 meaning severe, 4 meaning extreme, and 5 meaning total.

The above exemplifies the application of the new chemicals in the form of aqueous dispersions.

EXAMPLE IX

Bonny Best tomatoes averaging three inches in height were sprayed to runoff with aqueous emulsions of solvent and oil formulations of caproyl maleic hydrazide and benzoyl maleic hydrazide. Ten percent solutions of caproyl maleic hydrazide and benzoyl maleic hydrazide were prepared in benzene, in dibutylphthalate, and in Velsicol AR 60 (a hydrocarbon oil rich in dimethyl naphthalene and trimethyl naphthalene). The 10% solutions of the caproyl maleic hydrazide in the oils and solvent were emulsified in water containing 0.03% of Antarox A 200 as a dispersing and wetting agent, the dosages of caproyl and benzoyl maleic hydrazide in the emulsions being 1:400 (the concentrations of the benzene, dibutyl phthalate and Velsicol AR 60 being 1:40). Check plants were sprayed with an aqueous solution of 0.03% of the Antarox A 200, and also with 1:40 emulsions of the benzene, dibutyl phthalate, and Velsicol AR 60 in water containing 0.03% of Antarox A 200.

Thirty-seven days later the average height of the check tomato plants were: 30" for the 0.03% aqueous solution of Antarox A 200; 31" for the aqueous emulsion of benzene; 29" for the aqueous emulsion of dibutyl phthalate; and 24" for the aqueous emulsion of Velsicol AR 60. The various check plants showed no burning of the foliage, no chlorosis, and no development of anthocyanin pigmentation. The tomato plants treated with the aqueous emulsion of the caproyl maleic hydrazide dissolved in the benzene had an average height of 3" and showed development of heavy anthocyanin pigmentation. The tomato plants treated with the aqueous emulsion of the caproyl maleic hydrazide dissolved in the dibutyl phthalate had an average height of 3" and showed development of slight anthocyanin pigmentation. The tomato plants treated with the aqueous emulsion of caproyl maleic hydrazide dissolved in the Velsicol AR 60 had an average height of 2" and showed heavy burning and development of heavy anthocyanin pigmentation. The tomato plants treated with the aqueous emulsion of the benzoyl maleic hydrazide dissolved in the benzene had an average height of 29" but showed severe chlorosis. The tomato plants treated with the aqueous emulsion of the benzoyl maleic hydrazide dissolved in the dibutyl phthalate had an average height of 3" and showed slight chlorosis. The tomato plants treated with the aqueous emulsion of the benzoyl maleic hydrazide dissolved in the Velsicol AR 60 had an average height of 9" and showed no burn, chlorosis, nor development of anthocyanin pigmentation.

The above exemplifies the application of the new chemicals in the form of aqueous emulsions prepared from organic solvent solutions and oil formulations of the chemicals.

EXAMPLE X

Bonny Best tomatoes averaging 5" in height were sprayed to runoff with an aqueous dispersion of triethanolamine and propionyl maleic hydrazide. The propionyl maleic hydrazide was mixed in equal parts by weight with triethanolamine and dispersed in water containing 0.03% of Antarox A 200. The concentration of the propionyl maleic hydrazide in a spray was 1:400.

Check tomato plants were sprayed with an aqueous solution of Antarox A 200 without the triethanolamine mixture with propionyl maleic hydrazide.

Seven and one-half weeks later the average height of the check tomato plants was 25", and the plants showed no burning of the foliage, no chlorosis, and no development of anthocyanin pigmentation. The tomato plants treated with the aqueous dispersion of the triethanolamine and propionyl maleic hydrazide had an average height of the main stem of 3″, and the leaves showed slight chlorosis and severe anthocyanin pigmentation. The plants had secondary growth from axillary buds of 10″, and the secondary growth showed severe chlorosis.

EXAMPLE XI

Bonny Best tomato plants averaging 6″ in height were sprayed to runoff with aqueous dispersions of caproyl maleic hydrazide, and with aqueous emulsions of caproyl maleic hydrazide in oil solutions in LH 1 (a primarily aliphatic hydrocarbon oil having 20–25% aromatic content), in Sun Solvent 1547 (a highly aromatic organic solvent), and in Velsicol AR 60. The caproyl maleic hydrazide itself was dispersed at a 1:400 dosage in water containing 0.03% of Antarox A 200. The solutions of caproyl maleic hydrazide in the LH 1, in the Sun Solvent 1547, and in the Velsicol AR 60, were 10% solutions, and these were emulsified in water containing 0.03% Antarox A 200 giving a 1:400 dosage of the caproyl maleic hydrazide (and a 1:40 dosage of the solvents).

Check plants were sprayed with an aqueous solution of 0.03% Antarox A 200 and with emulsions of the LH 1, Sun Solvent 1547, and Velsicol AR 60, at 1:40 dosages of the solvent in water containing 0.03% of the Antarox A 200.

Six weeks later the average height of the plants sprayed with the aqueous solution of the Antarox A 200 was 31″, the average height of the plants sprayed with the aqueous emulsion of the LH 1 was 36″, the average height of the plants sprayed with the aqueous emulsion of the Sun Solvent 1547 was 32″, and the average height of the plants sprayed with the aqueous emulsion of the Velsicol AR 60 was 24″. No burning, chlorosis or anthocyanin pigmentation appeared on these plants. The plants treated with the aqueous dispersion of the caproyl maleic hydrazide itself had an average main stem height of 5″ with an average secondary growth of 24″. Foliage on the main stems showed heavy chlorosis and development of anthocyanin pigmentation. The plants treated with the aqueous emulsion of the caproyl maleic hydrazide dissolved in the LH 1 showed an average height of 5″ for the main stem, and 8″ for secondary growth. Foliage on the main stem showed heavy chlorosis and development of heavy anthocyanin pigmentation. The plants sprayed with the aqueous emulsion of the caproyl maleic hydrazide dissolved in the Sun Solvent 1547 had an average height of 6″ for the main stem and 7″ for the secondary growth. Foliage on the main stem showed heavy chlorosis and anthocyanin pigmentation. The plants sprayed with the aqueous emulsion of caproyl maleic hydrazide dissolved in the Velsicol AR 60 had an average main stem height of 3″ with no secondary growth. The plants showed severe burning.

In different tests Bonny Best tomato plants averaging 6″ in height were sprayed to runoff with an aqueous dispersion of 2-ethyl hexoyl maleic hydrazide and with an aqueous emulsion of 2-ethyl hexoyl maleic hydrazide in Velsicol AR 60. The dosages in each case was 1:200 based on the 2-ethyl hexoyl maleic hydrazide. The 2-ethyl hexoyl maleic hydrazide in the second case was dissolved in the Velsicol AR 60 as a 35% solution, giving a dosage of 1:107 for the Velsicol AR 60. Antarox A 200 was present in amount of 0.03% based on the water. Check plants were sprayed with an aqueous solution of 0.03% of the Antarox A 200 and also with an aqueous emulsion of 1:107 dosage of the Velsicol AR 60 in the 0.03% Antarox A 200 aqueous solution.

Ten weeks later the average height of the check plants sprayed with the aqueous solution of 0.03% of the Antarox A 200 was 36″, and the plants showed heavy chlorosis. The average height of the check plants sprayed with the aqueous emulsion of the Velsicol AR 60 was 27″, and the plants showed severe chlorosis. The plants sprayed with the aqueous dispersion of the 2-ethyl hexoyl maleic hydrazide showed an average height of the main stem of 7″, and an average height of the secondary growth of 28″. Foliage on the main stems showed heavy burning, severe chlorosis, and development of heavy anthocyanin pigmentation. The plants treated with the aqueous emulsions of the 2-ethyl hexoyl maleic hydrazide dissolved in the Velsicol AR 60 had an average height of 3″ main stem, with no secondary growth. The plants showed heavy burning and heavy chlorosis.

The above exemplifies the greater plant growth regulant effect in the application of the new chemicals in the form of aqueous emulsions of the chemicals dissolved in organic oils or solvents as compared with sprays of aqueous dispersions of the chemicals without such oil or solvent.

EXAMPLE XII

Maleic hydrazide and 2-ethyl hexoyl maleic hydrazide were formulated as 30% concentrations in the following materials: Carbowax 1500 (polyethylene glycol having an average molecular weight of 500 to 600), Crisco (hydrogenated glyceride oil), Tween 20 (polyoxyethylene sorbitan mono laurate), lanolin, and soybean oil. The various oil and paste formulations thus prepared were applied in a thin band about ½″ wide at the internode about 1″ from the terminal of Bonny Best tomato plants averaging 6″ in height. A similar band was applied at the internode between the cotyledons and primary leaves of pinto bean plants averaging 6″ in height and in the 2-leaf stage. Untreated check plants and check plants treated only with the Carbowax 1500, Crisco, Tween 20, lanolin, and soy bean oil alone, were also included in the series. Average height measurements were made after two weeks with the results shown in the following table:

| Treatment | Tomatoes—Average Height | Beans—Average Height |
| --- | --- | --- |
|  | Inches | Inches |
| Maleic hydrazide in Carbowax | 12 | 6 |
| 2-ethyl hexoyl maleic hydrazide in Carbowax 1500 | 9 | 5 |
| Carbowax 1500—check | 11 | 8 |
| Maleic hydrazide in Crisco | 13 | 8 |
| 2-ethyl hexoyl maleic hydrazide in Crisco | [1]3 | 5 |
| Crisco—check | 14 | 7 |
| Maleic hydrazide in Tween 20 | 5 | 4 |
| 2-ethyl hexoyl maleic hydrazide in Tween 20 | dead | dead |
| Tween 20—check | 13 | 8 |
| Maleic hydrazide in lanolin | 14 | 8 |
| 2-ethyl hexoyl maleic hydrazide in lanolin | 7 | 6 |
| Lanolin—check | 12 | 8 |
| Maleic hydrazide in soybean oil | 4 | 6 |
| 2-ethyl hexoyl maleic hydrazide in soybean oil | [1]1 | [1]4 |
| Soybean oil—check | 8 | 7 |
| Untreated—check | 11 | 8 |

[1] Topped.

The expression "topped" in the above table means that the cells under the band collapsed causing the upper portion of the plant to topple and eventually die; the plant below the point of application remained green.

The above exemplified different applications of the new acylated derivatives of maleic hydrazide as plant growth regulants and their greater effectiveness as plant growth regulants in various oil and similar formulations over maleic hydrazide itself in the same formulations.

EXAMPLE XIII 2-ethyl hexoyl maleic hydrazide was dissolved in Velsicol AR 60 to produce a 30% solution. This was diluted with water to produce a 1-200 concentrate of 2-ethyl hexoyl maleic hydrazide. A second dilution of 1-85 of Velsicol AR 60 alone was used as a check equivalent to the oil content of the first dilution. These were sprayed on two replicates each of pinto beans in the two leaf stage averaging three inches in height. Each of the replicates contained five plants. No emulsifying or wetting agent was used. The dispersion was produced by vigorous agitation by a mechanical stirrer. The plants were sprayed and placed in the greenhouse along with untreated check plants. After 22 days there were three dead plants and seven nearly dead in the 2-ethyl hexoyl maleic hydrazide treatment. No growth had occurred. The Velsicol AR 60 check plants averaged nineteen inches in height and were blossoming. The untreated checks averaged nineteen inches in height and were blossoming. After 33 days, all the beans in the 2-ethyl hexoyl maleic hydrazide treatment were dead. The Velsicol AR 60 check and untreated checks were the same as recorded above.

The above exemplifies the phytocidal effect of the plant growth regulants of the present invention.

Having thus described our invention, what we claim and desire to protect by Letters Patent is:

1. A plant growth regulant composition comprising a monoacylated derivative of maleic hydrazide, said composition containing a wetting agent.
2. A plant growth regulant composition comprising an aqueous dispersion of a monoacylated derivative of maleic hydrazide, said aqueous dispersion containing a wetting agent.
3. A plant growth regulant composition comprising a monoacylated derivative of maleic hydrazide in an organic medium.
4. A plant growth regulant composition comprising 2-ethyl hexoyl maelic hydrazide in an organic medium.
5. A plant growth regulant composition comprising a monoacylated derivative of maleic hydrazide and an oil.
6. A monoacylated derivative of maleic hydrazide.
7. An agricultural chemical composition comprising a monoacylated derivative of maleic hydrazide in which the parent acid of the acyl substituent is selected from the group consisting of aliphatic monocarboxylic acids, aromatic monocarboxylic acids, heterocyclic monocarboxylic acids, aliphatic dicarboxylic acids, and aromatic dicarboxylic acids.
8. An alkanoyl maleic hydrazide.
9. An aroyl maleic hydrazide.
10. A cyclic substituted alkanoyl maleic hydrazide in which the alkanoyl radical contains the cyclic substituent.
11. Acetyl maleic hydrazide.
12. Caproyl maleic hydrazide.
13. 2-ethyl hexoyl maleic hydrazide.
14. Benzoyl maleic hydrazide.
15. 2,4-dichlorophenoxyacetyl maleic hydrazide.
16. The method which comprises treating growing plants with a monoacylated derivative of maleic hydrazide.
17. The method of altering the growth characteristics of plants which comprises treating the plants with an alkanoyl maleic hydrazide.
18. The method of altering the growth characteristics of plants which comprises treating the plants with an aroyl maleic hydrazide.
19. The method which comprises treating growing plants with acetyl maleic hydrazide.
20. The method which comprises treating growing plants with 2-ethyl hexoyl maleic hydrazide.
21. The method which comprises treating growing plants with benzoyl maleic hydrazide.

JOHN W. ZUKEL.
WALTER D. HARRIS.

REFERENCES CITED

The following references are of record in the file of this patent:

UNITED STATES PATENTS

| Number | Name | Date |
|---|---|---|
| 2,277,744 | Cuprey et al. | Mar. 31, 1942 |
| 2,390,941 | Jones | Dec. 11, 1945 |
| 2,392,859 | Meuli | Jan. 5, 1946 |
| 2,394,916 | Jones | Feb. 12, 1946 |
| 2,396,513 | Jones | Mar. 12, 1946 |
| 2,412,510 | Jones | Dec. 10, 1946 |
| 2,416,198 | Moyer | Feb. 18, 1947 |

OTHER REFERENCES

Science, vol. 109 (June 10, 1949), pgs. 588 to 590.